(12) United States Patent
Gough et al.

(10) Patent No.: US 11,643,015 B2
(45) Date of Patent: May 9, 2023

(54) EXTERIOR REARVIEW DEVICE FOR AUTOMOTIVE VEHICLES AND KIT OF PARTS

(71) Applicant: Motherson Innovations Company Limited, London (GB)

(72) Inventors: Joel James Gough, Memphis, MI (US); Gary Sinelli, Birmingham, MI (US); John Scharfenkamp, Troy, MI (US)

(73) Assignee: Motherson Innovations Company Limited, London (GB)

( * ) Notice: Subject to any disclaimer, the term of this patent is extended or adjusted under 35 U.S.C. 154(b) by 53 days.

(21) Appl. No.: 17/235,374

(22) Filed: Apr. 20, 2021

(65) Prior Publication Data

US 2021/0331624 A1 Oct. 28, 2021

Related U.S. Application Data

(60) Provisional application No. 63/013,752, filed on Apr. 22, 2020.

(51) Int. Cl.
  *B60R 1/06* (2006.01)
  *F21S 43/31* (2018.01)
  *B60R 1/12* (2006.01)

(52) U.S. Cl.
  CPC .............. *B60R 1/06* (2013.01); *B60R 1/1207* (2013.01); *F21S 43/31* (2018.01); *B60R 2001/1215* (2013.01); *B60R 2001/1253* (2013.01)

(58) Field of Classification Search
  CPC ................... B60R 1/06; B60R 1/1207; B60R 2001/1215; B60R 2001/1253; F21S 43/31; F21S 43/14; F21S 43/19; F21S 43/26; F21S 43/40; B60Q 1/2665
  See application file for complete search history.

(56) References Cited

U.S. PATENT DOCUMENTS

2005/0243568 A1* 11/2005 Rodriguez Barros ........................ B60R 1/1207
  362/494
2007/0184284 A1* 8/2007 Varaprasad ............. B32B 17/06
  428/522

FOREIGN PATENT DOCUMENTS

| DE | 20011341 U1 | 9/2000 |
| DE | 102007010747 A1 | 8/2008 |
| EP | 2159103 A2 | 3/2010 |
| WO | WO 2011/058875 A1 | 5/2011 |

* cited by examiner

*Primary Examiner* — Sath V Perungavoor
*Assistant Examiner* — Tyler B Edwards
(74) *Attorney, Agent, or Firm* — Jones Day

(57) ABSTRACT

An exterior rearview device for an automotive vehicle includes a cover body with a cover body opening where the cover covers a front part of at least one reflective means, display or camera accommodated in the cover body. The exterior rearview device also contains a light module having a base body, a lens attachable to the base body and a selected functional device selected from at least two different functional devices each of which is adapted to achieve a specific light function. The base body is attachable to the cover body such that, in an attached state, the lens is arranged in the cover body opening, and the selected functional device is attachable to the base body such that, in the attached state, light from the light module passes through the lens to fulfil the specific light function of the selected functional device.

14 Claims, 5 Drawing Sheets

EXTERIOR REARVIEW DEVICE FOR AUTOMOTIVE VEHICLES AND KIT OF PARTS

CROSS-REFERENCE TO RELATED APPLICATIONS

This application claims the benefit of U.S. Provisional Patent Application No. 63/013,752, filed Apr. 22, 2020, which is hereby incorporated by reference in its entirety for all purposes.

BACKGROUND

1. Field

This disclosure generally relates to rearview devices for automotive vehicles and, more particularly, to an exterior rearview mirror (also referred to as an exterior side mirror) extending from a side, e.g. a door, of the vehicle. This disclosure further relates to a kit of parts and an automotive vehicle comprising such an exterior rearview device.

2. Related Art

Exterior rearview mirrors generally mounted to both sides, e.g. a driver's and a passenger's door, of the vehicle are well known. Moreover, it is also known to furnish vehicle side mirrors with lighting functions such as direction indicators and/or surrounding lighting. Such an exterior rearview mirror for vehicles is described in DE 10 2007 010 747 A1 for example. Various configurations of the exterior rearview mirror and a lighting device are disclosed depending on a specific lighting function provided by the rearview mirror. However, the various configurations comprise different designs of a housing of the lighting device and/or different designs of a cover body of the rearview mirror including, inter alia, different attachment points, consequently resulting in an elevated configuration and assembling complexity as well as higher manufacturing cost.

Therefore, it would be desirable to improve an exterior rearview device for automotive vehicles providing different lighting functionalities while simplifying the design, reducing the complexity, installation set-up time, number of components etc.

SUMMARY

It is an object of this disclosure to provide an exterior rearview device for an automotive vehicle and a kit of parts including such a rearview device, which provide improved performance, in particular for the benefit of installation ease and reduced set-up time, manufacturing ease and reduced costs, reduced number of components, reduced over all complexity, reduced weight and ease of repair as well as exchange of part.

These objects are achieved by an exterior rearview device for an automotive vehicle, comprising a cover body, which covers a front part of at least one reflective means, display and/or camera accommodated in the cover body has a cover body opening, and a light module, which comprises a base body, a lens attachable to the base body and a selected functional device selected from at least two different functional devices each of which is adapted to achieve a specific light function, wherein the base body and/or the lens is/are attachable to the cover body such that, in the attached state, the lens is arranged in the cover body opening, and wherein the selected functional device is attachable to the base body such that, in the attached state, light from the light module passes the lens to fulfil the specific light function of the selected functional device.

According to one variation, each functional device fulfils a different light function such that the light module acts as a daytime running light, a direction indicator light, a position light, a surrounding light, a spot light, or a combination thereof.

It is proposed that each functional device comprises at least one light source and at least one light guide or reflector, wherein preferably the light source is provided in form of a LED and is connected to a printed circuit board.

Variations of the disclosure are further characterized in that the reflector of a first functional device has a reflector surface comprising at least one aperture, with the respective light source being arranged in the at least one aperture.

It is also proposed that the aperture of the reflector of the first functional device is funnel-shaped, and the main light emitting direction of the light of the first functional device is directed essentially in the forward direction for passing the lens in the attached state to provide a forward-facing spot light. The reflector of the first functional device is arranged at least partly parallel to the respective printed circuit board.

Variations of the disclosure can be characterized in that the printed circuit board is arrange between the reflector and the base body in the attached state, wherein the printed circuit board mechanically attaches the reflector to the base body comprised by the first functional device, Another variation is the reflector of a second functional device has a closed reflector surface, with the respective light source being arranged between the closed reflector surface and the lens in the attached state.

Still further variations can be characterized in that the light source of the second functional device is arranged at a first end with respect to a widthwise direction of the light module with a main light emitting direction being oriented towards a second end in the widthwise direction of the light module, the second end being located diametrically opposed to the first end, in particular to provide a direction indicator light. The reflector of the second functional device is arranged at least partly perpendicular to the respective printed circuit board.

Variations of the disclosure can be characterized in that the printed circuit board is arrange between the reflector and the lens in the attached state, wherein the printed circuit board mechanically attaches the reflector to the lens comprised by the second functional device.

It is also proposed that the light source is mechanical attached on the printed circuit board, wherein the light source is comprised by the second functional device.

In addition, it is proposed that the reflector surface of the reflector has an overall curvature being convex with respect to a widthwise direction of the reflector.

In addition, it is proposed that each functional device is detachably attachable, and/or the lens is detachably attachable.

Still further variations can be characterized in that each functional device is pre-formed.

It is proposed that a kit of parts comprises an exterior rearview device according to the disclosure and at least two different light devices.

According to one variation, an automotive vehicle comprises at least one exterior rearview device according to the disclosure.

Thus, according to one aspect of this disclosure, an exterior rearview device is provided for an automotive vehicle, e.g. a passenger car, van, bus, truck and the like, comprising a cover body covering a front part of a reflective element, display and/or camera that is/are accommodated in the cover body. As is generally well known, when an exterior rearview mirror is mounted to a vehicle, e.g. attached to a driver's door of the vehicle, the mirror itself serves as a means for a driver of the vehicle to observe traffic events behind the vehicle. Accordingly, as soon as mounted, the front part of the cover body corresponds to a direction of forward driving of the vehicle, while the reflective element, display and/or camera itself is/are accommodated on a rear portion of the cover body to allow the observation of the rearward traffic. The cover body can include a cover body opening, i.e. a through hole.

The exterior rearview device can include a light module comprising a base body, a lens attachable to the base body, at least one light source, and a reflector for reflecting light being emitted by the light source. The base body and the lens, when assembled, define an interior therebetween accommodating the reflector and the light source forming a functional device adapted to achieve a specific light function. Thus, the functional device is received in the interior of the light module being formed by assembling the base body and the lens.

According to a variation, the light module is attachable to the cover body such that, in the attached state of the light module, the lens is arranged in the cover body opening.

Moreover, the light source and the reflector are configurable and arrangeable such that, in the attached state of the light module, the light emitted by the light source and, at least partially, being reflected by the reflector and passing the lens achieves different light functions. In other words, depending on the specific functional device determined by the configuration of at least one of the reflector and the light source as well as their arrangement relative to each other within the light module, different light functions may be implemented. Such light functions may include, without being limited thereto, daytime running light, direction indicator light, position light, surrounding lighting (e.g. the vicinity of the vehicle), spotlighting (e.g. in the forward and/or sideward direction of the vehicle), or any combination thereof. It is to be understood that one of the afore-mentioned light functions may be implemented in one exterior rearview device or a combination of two or more of the afore-mentioned light functions.

A light module is adapted to receive different configurations and arrangements of the light source and the reflector according to the respective light function to be implemented by selecting one functional device from two or more different functional devices. In other words, the same light module, particularly having only one specific exterior design, is used to provide the exterior rearview device with a light function desired. Consequently, the mounting, in particular the attachment points, of the light module in the cover body is always the same irrespective of the light function to be implemented in the exterior rearview device. Hence, only the functional device may change according to the specific light function while all other components of the exterior rearview device, particularly the cover body, remain constant. Limiting construction variations to the smallest component possible in the exterior rearview device improves manufacturing ease and cost as well as installation ease and set-up time. As fewer components are required and standardized components may be used, the complexity of the exterior rearview device is reduced as well.

Yet according to other variations, fulfilling a first of the different light functions by installing a first functional device in the light module, the reflector has a reflector surface comprising at least one aperture, wherein the light source is arranged in the aperture. This variation is used to implement a spotlighting or surrounding light function of the exterior rearview device. The arrangement of the light source in the aperture of the reflector allows a main emitting direction of the light to be oriented essentially in the forward direction (with respect to the vehicle when mounted thereto). Such lighting can be used as a spotlight to illuminate the surroundings of the vehicle, for example. The aperture of the reflector can be funnel-shaped, in particular trumpet-shaped, thus further improving illumination power and efficiency of the light source.

According to a variation corresponding to a second light function, the reflector has an entirely closed reflector surface, wherein the light source is arranged between the closed reflector surface and the lens. In other words, the reflector surface does not contain any opening in its effective reflecting area. Thus, essentially all the light being emitted from the light source is reflected by the reflector, thus, resulting in a high illuminating power of the light module and rearview device, respectively. This configuration and arrangement are most used to implement a direction indicator light function of the rearview device.

The light source can be arranged at a first end with respect to a widthwise direction of the light module with a main light emitting direction being oriented towards a second end in the widthwise direction of the light module, wherein the second end is located diametrically opposed to the first end. In other words, when attached to the vehicle, the light source of the exterior rearview device is located proximal to the vehicle (i.e. the first end) and emitting light essentially laterally away from the vehicle to a distal end (i.e. the second end) of the rearview device/light module with respect to the vehicle. Thus, the second/distal end essentially corresponds to a lateral extremity of the vehicle when the exterior rearview device is mounted thereto. Again, this configuration determining a second functional device is mostly preferred when used to implement a direction indicator light function as traffic located at the side of the vehicle or even behind it will be able to recognize the blinking light within the exterior rearview device.

According to variations, the reflector surface of the reflector has an overall curvature being convex with respect to a widthwise direction of the reflector. It is to be understood that, in the sense of the present application, the term convex means a curvature that is directed in a forward direction, i.e. towards the lens of the light module being arranged in front of the reflector. Consequently, a concave curvature of the reflector surface would be a curvature being directed in the rearward direction, i.e. away from the lens. This variation is advantageous as it improves compactness of the light module, particularly with respect to its thickness. The curvature of the reflector surface is a continuous convex curvature, meaning that the curvature does not have any inflection points.

According to still further variations, the at least one light source is attached to a printed circuit board (hereinafter also denoted as a PCB). The PCB provides either mechanical fixation of the light source relative to both the reflector and the lens of the light module as well as electrical connection in order to control the supply of electrical power to the light source when needed for the respective light function.

Yet according to other variations, the printed circuit board is attached to the reflector, thus achieving unique configurations and arrangements of the light source and the reflector for each light function to be implemented. A pre-configuration of the functional device is possible further improving manufacturing/installation ease and cost.

According to a second aspect, a kit of parts is provided and comprises an exterior rearview device according to any of the herein disclosed variations thereof, and at least two different configurations and arrangements of the at least one light source and the reflector according to two light functions chosen to be implemented. Each configuration and arrangement of the light source and the reflector are pre-configured.

It is to be emphasized that with regard to the effects and advantages of the features regarding the kit of parts according to this disclosure, also reference is made to the full extent to corresponding features of the exterior rearview device according to this disclosure. Therefore, if technically meaningful and applicable, features of the exterior rearview device according to this disclosure shall be regarded also as disclosed features for variations of the kit of parts according to this disclosure unless explicitly stated otherwise. Likewise, features of the kit of parts according to this disclosure shall be regarded also as features applicable to variations of the exterior rearview device system according to this disclosure unless explicitly stated otherwise. Hence, for the purpose of conciseness and ease of readability and for the sake of convenience duplicate detailed explanations of analogous features are largely omitted or at least reduced to a minimum herein.

According to a third aspect, an automotive vehicle comprising at least one exterior rearview device as described above is provided.

The above listed variations can be used individually or in any combination to provide the method and the devices in accordance with this disclosure.

Furthermore, it is to be noted that a conjunction "and/or", if used herein in order to combine a first and a second feature, is to be construed as disclosing a first variation of the present disclosure that may comprise only the first feature, a second variation of the present disclosure that may comprise only the second feature, and a third variation of the present disclosure that may comprise both the first and second features.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
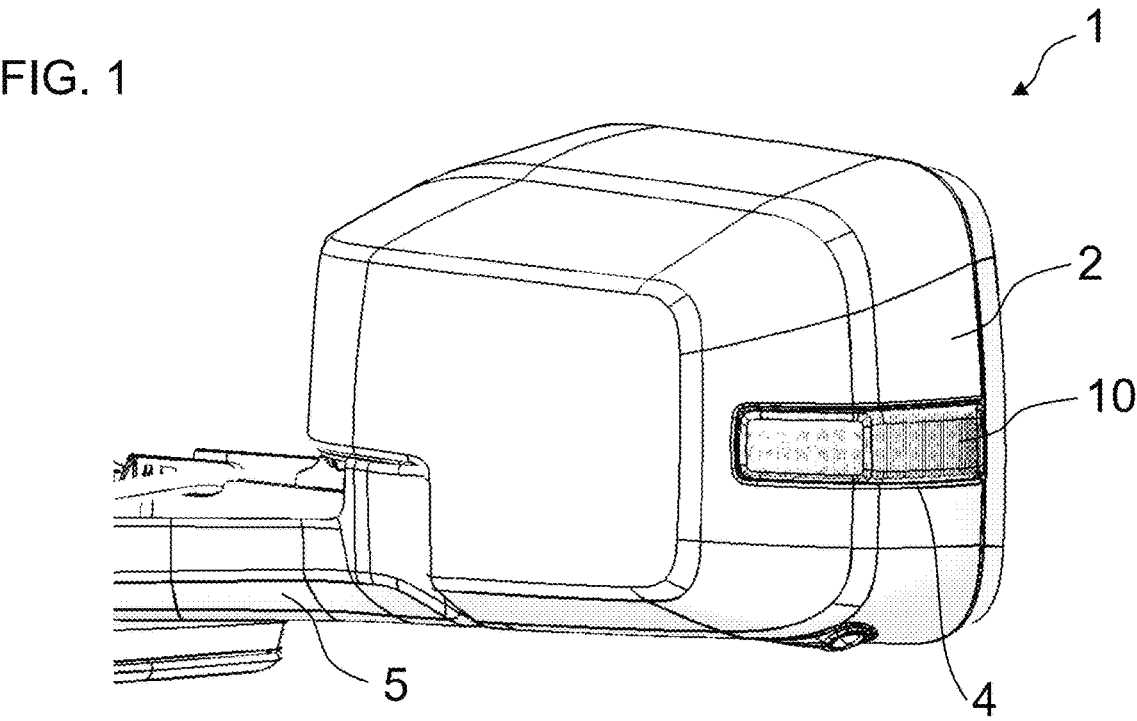
FIG. 1 shows a perspective view of a front part of an exemplary exterior rearview device for an automotive vehicle according to the present disclosure.
Figure 2:
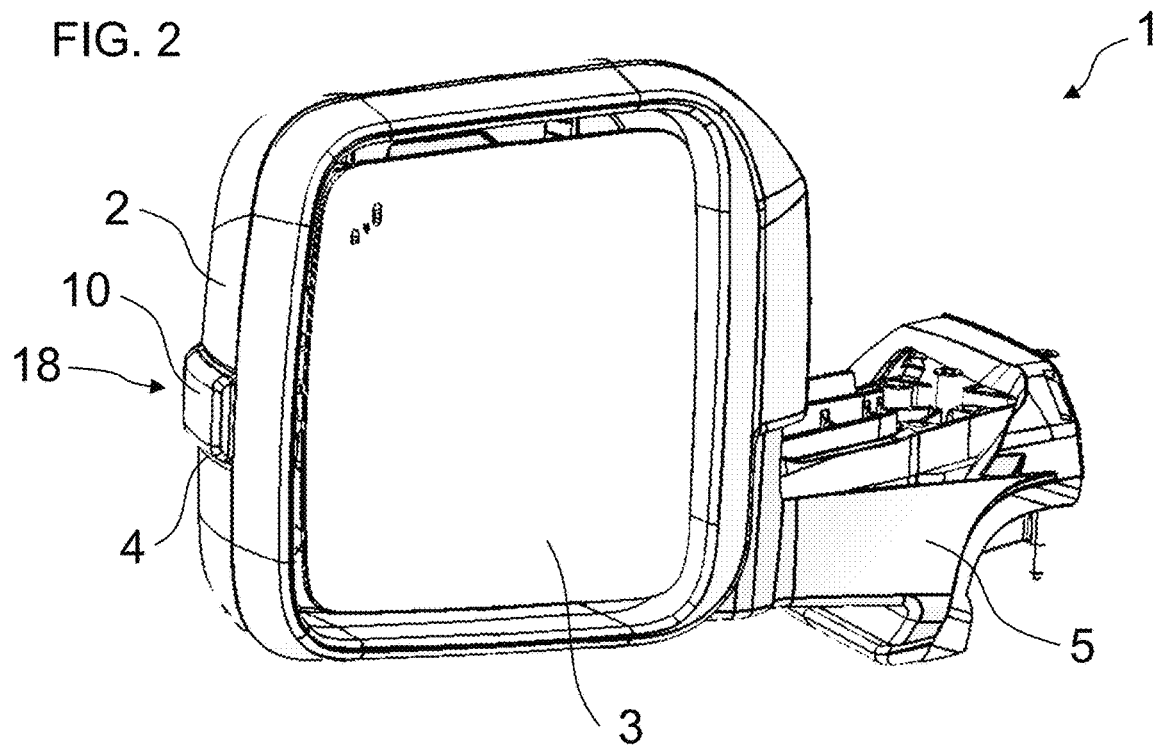
FIG. 2 shows a perspective view of a rear part of the exterior rearview device of FIG. 1 according to the present disclosure.

FIG. 1 shows a perspective view of a front part of an exemplary exterior rearview device in form of an exterior rearview mirror 1 for an automotive vehicle (not shown). FIG. 2 shows a perspective view of the rear of the exterior rearview mirror 1 of FIG. 1.

As is shown, the exterior rearview mirror 1 comprises a cover body 2 and a reflective means in form of a mirror 3 accommodated in the cover body 2. In alternative variations of a rearview device the mirror 3 can be substituted by a display, camera, or a combination thereof. Further, the cover body 2 includes a cover body opening 4. In the variation shown, the cover body opening 4 is located essentially in an exterior side wall of the cover body 2, though not being limited thereto. As is well-known, the exterior rearview mirror 1 is (generally rotatably) supported on a mirror arm 5 which, in turn, may be fixedly attached to the vehicle (not shown), e.g. to a vehicle door, a vehicle body and the like.

Figure 3:
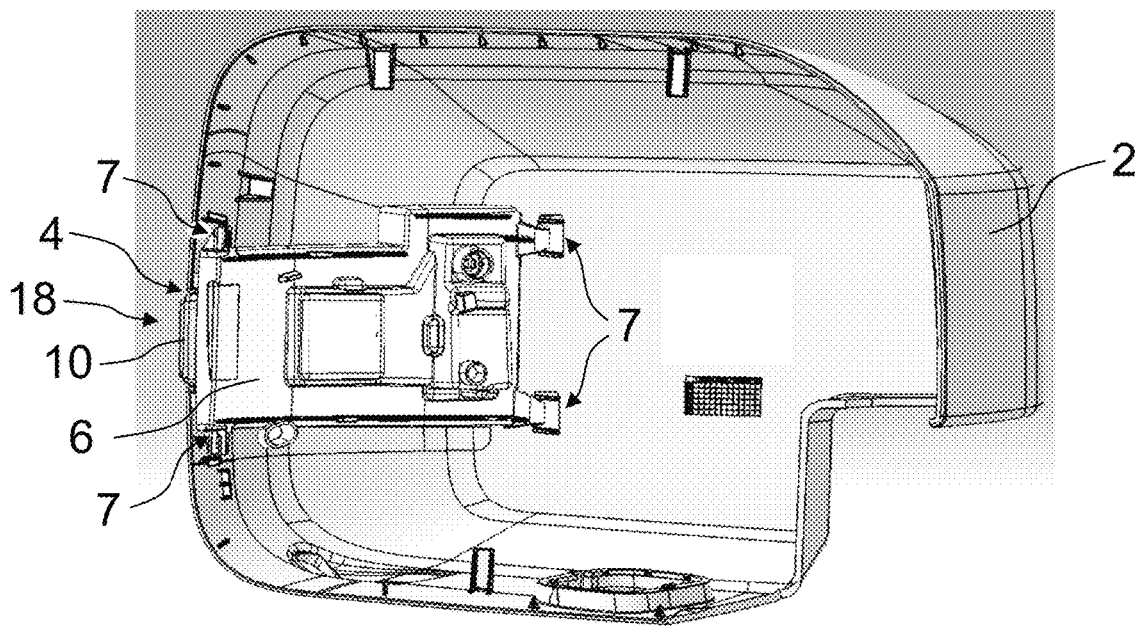
FIG. 3 shows a perspective view of an interior of a cover body of the exterior rearview device of FIG. 1 comprising an exemplary light module according to the present disclosure.

FIG. 3 shows a perspective view of an interior of the cover body 2 of the exterior rearview mirror 1 of FIG. 1 comprising an exemplary light module 6. Light module 6 is attached to the cover body 2 at a plurality of predetermined attachment points 7 by attachment means 8 provided on light module 6 (see FIG. 4) and/or on the cover body 2 (not shown). The light module 6 may be non-destructively detachable from the cover body 2, for example by employing attachment means 8 as non-destructive means such as clips or pawls. It is to be understood that other attachment techniques may be employed as well for attaching the light module 6 to the cover body 2, e.g. gluing, screwing, clamping and the like. In FIG. 3, the light module 6 is shown from its rear/back side.

Figure 4:
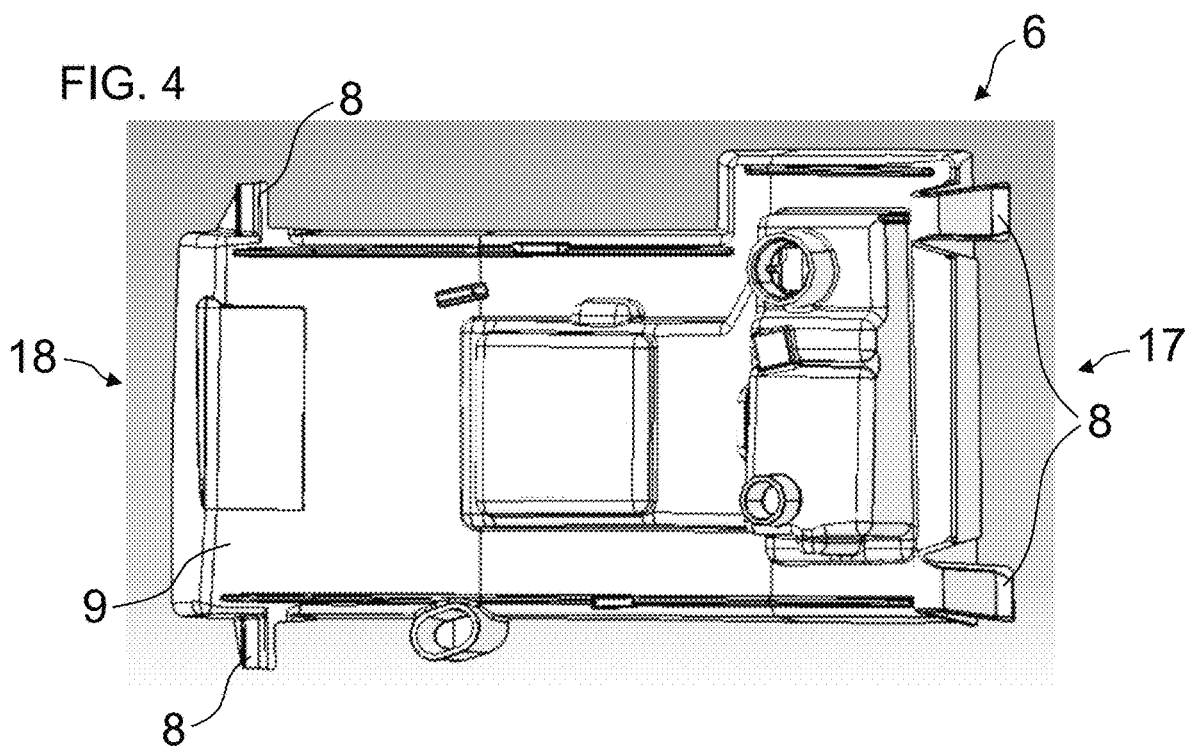
FIG. 4 depicts a rear side of the light module of FIG. 3 in an enlarged view according to the present disclosure.

FIG. 4 depicts the rear/back side of the light module 6 of FIG. 3 in an enlarged view that clearly shows the attachment means 8 of the exemplary light module 6. The backside of the light module 6 is formed by a base body 9 and attachment means 8 are integrally formed with the base body 9.

Figure 5:
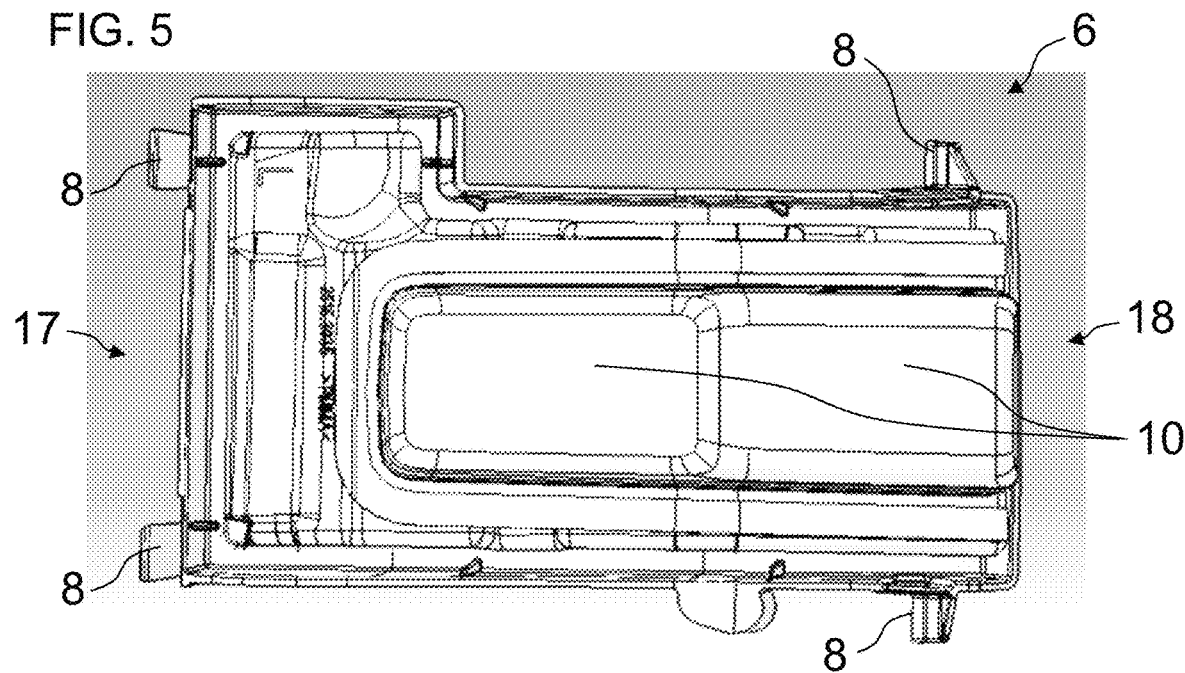
FIG. 5 depicts a front side of the light module of FIG. 3 in an enlarged view according to the present disclosure.

FIG. 5 depicts a front side of the light module 6 of FIG. 3 in an enlarged view. The front side of the light module 6 is formed by a lens 10. The lens 10, which may be translucent or even transparent, is attachable to the base body 9, defining a cavity therebetween. Furthermore, the light module 6 is attachable to the cover body 2 such that, in the attached state of the light module 6, the lens 10 is arranged in the cover body opening 4 as shown in FIGS. 1-3.

Figure 6:
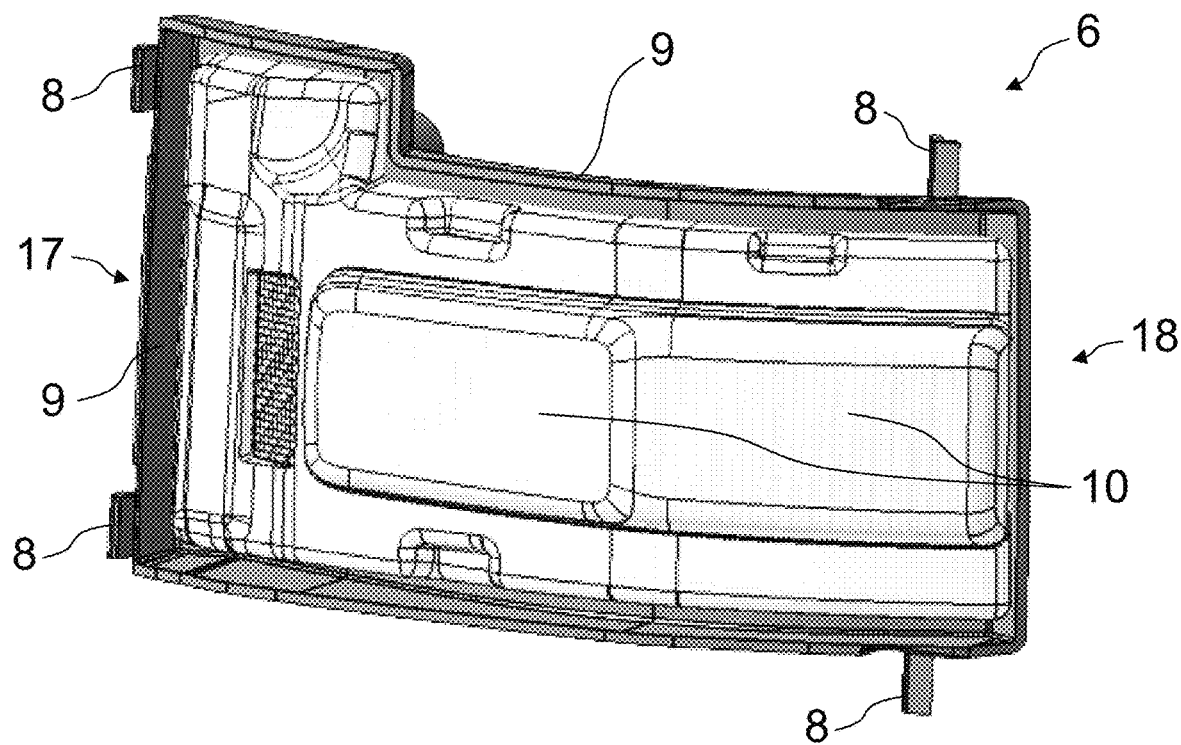
FIG. 6 shows a perspective view of the front side of the light module of FIG. 5 according to the present disclosure.

FIG. 6 shows a perspective view of the front side of the light module of FIG. 5, thus revealing further details of the base body 9 and the lens 10. The components of the light module 6 are made of a plastic material. Particularly, the components may be manufactured by molding, especially by injection molding, though not being limited thereto.

Figure 7A:
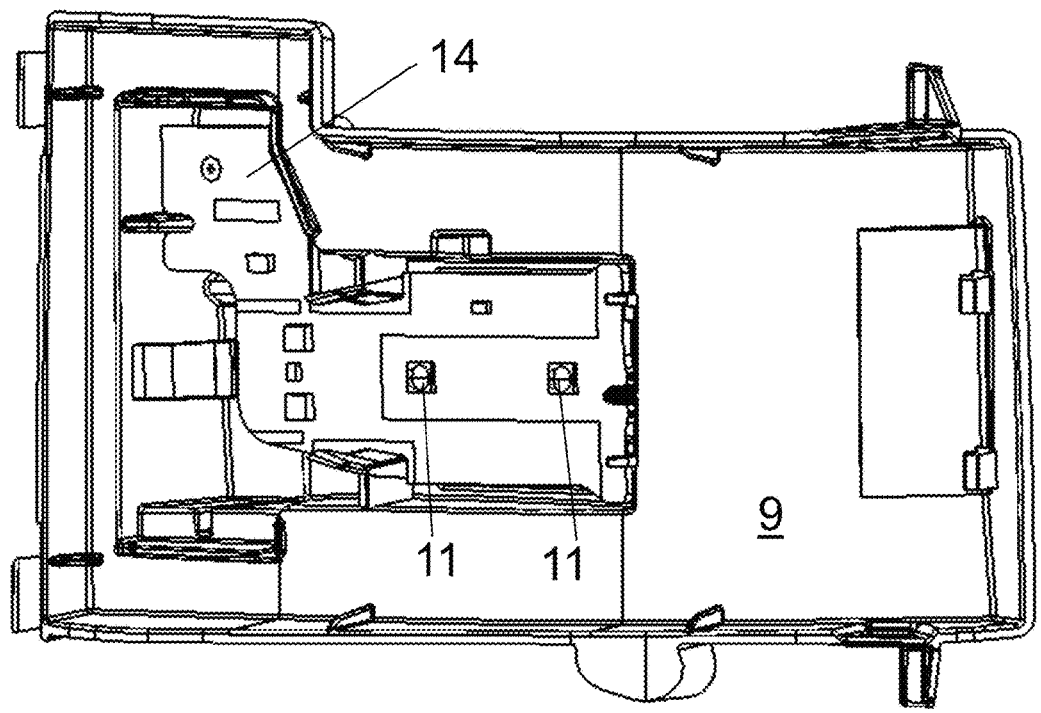
FIG. 7A depicts a front side of a base body of the light module of FIGS. 3-6 with a printed circuit board for an exemplary first configuration provided by a first functional device according to the present disclosure.
Figure 7B:
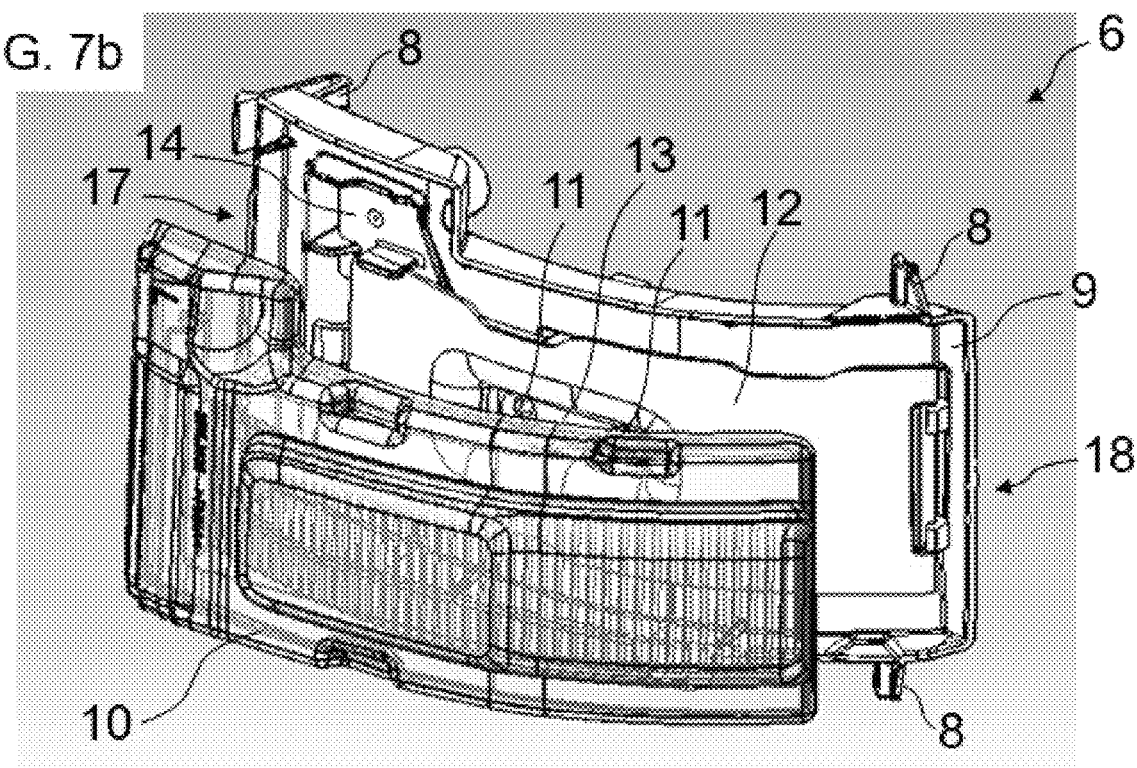
FIG. 7B illustrates a partly exploded view of the front side of the light module of the first configuration shown in FIG. 7A according to the present disclosure.

FIGS. 7A-B illustrate the light module 6 in an exemplary first configuration. In the first configuration, light module 6 is provided by having a first functional device arranged between the base body 9 and the lens 10. As shown in FIG.

7A, said first functional device comprises two light sources 11 (in this example variation, the light sources 11 are implemented as LEDs) on a printed circuit board 14. As shown in FIG. 7B, said first functional device also comprises a single reflector 12 for reflecting light emitted by the light sources 11. As is clear from FIG. 7B, the light sources 11 and the reflector 12 are accommodated within the cavity formed by the base body 9 and the lens 10 when assembled together and define the first configuration. The first configuration is determined by the first functional device comprising the light sources 11, the reflector 12, and the first functional device being adapted for a specific first light function described in further detail below.

The reflector surface of the reflector 12 (i.e. the surface of the reflector facing the lens 10) has an overall curvature which is convex with respect to a widthwise direction of the reflector 12 (corresponding to the width direction of the plane of projection of FIG. 7B). The convex curvature of the reflector 12 arranges the reflector surface such that it matches the curvature of the inner surface of lens 10. Furthermore, in the variation shown in FIG. 7B, the reflector surface of the reflector 12 comprises one aperture 13, within which the two light sources 11 are arranged. In particular, the aperture 13 of the reflector 12 is funnel-shaped or even trumpet-shaped. In an alternative variation, instead of the aperture 13 a recess for housing the light sources is provided.

In this example variation, the first functional device of light module 6 further comprises a printed circuit board (PCB) 14 to which light sources 11 are attached. The PCB 14 is partly arranged behind reflector 12 with the reflector 12 attached to adjacent surface of the PCB 14. In this variation, the partial arrangement of PCB 14 behind the reflector 12 allows the two light sources 11 to be arranged within the aperture. The contour geometry of the PCB 14 at the two light sources 11 cooperates with the geometry of the reflector 12 at the aperture 13 and in this variation, the corresponding geometry may be substantially parallel. The PCB 14 is attached to the base body 9 of the light module 6 by an attachment means as shown in FIG. 7B. In this non-limiting example variation, the attachment means used to attach the PCB 14 to the base body 9 are clips. This allows an easy non-destructive removal of the first functional device from the light module 6, for example to be exchanged by a second functional device fulfilling a different light function.

In the variation shown in FIGS. 7A-B with the first functional device, the specific configuration and arrangement of the light sources 11 and the reflector 12 facilitates a main light emitting direction of the light from the light sources 11 to be directed essentially in the forward direction immediately passing the lens 10, thus forming a forward-facing spot lamp. Hence, the variation of FIGS. 7A-B with the installed first functional device is used to implement a spotlighting or surrounding lighting function as the first light function to illuminate the surroundings of a vehicle (not shown) to which the exterior rearview mirror 1 is attached.

Figure 8A:
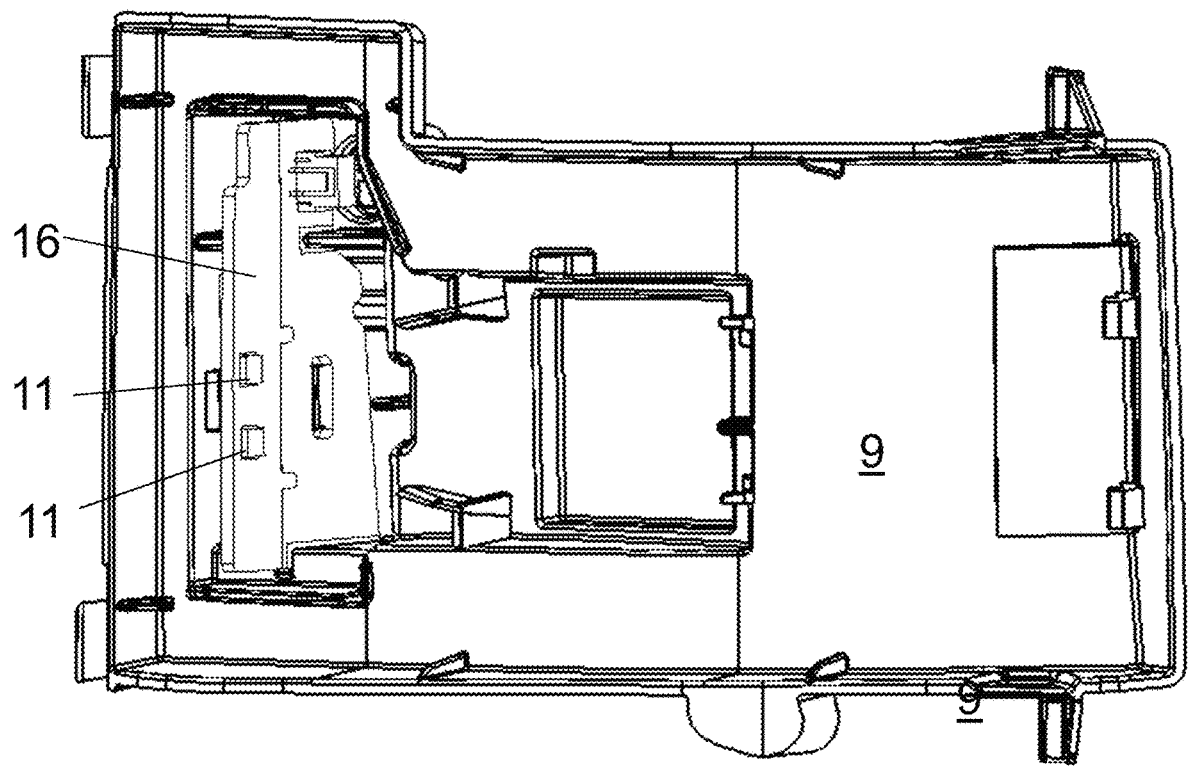
FIG. 8A depicts a front side of a base body of the light module of FIGS. 3-6 with a printed circuit board for an exemplary second configuration provided by a second functional device according to the present disclosure.
Figure 8B:
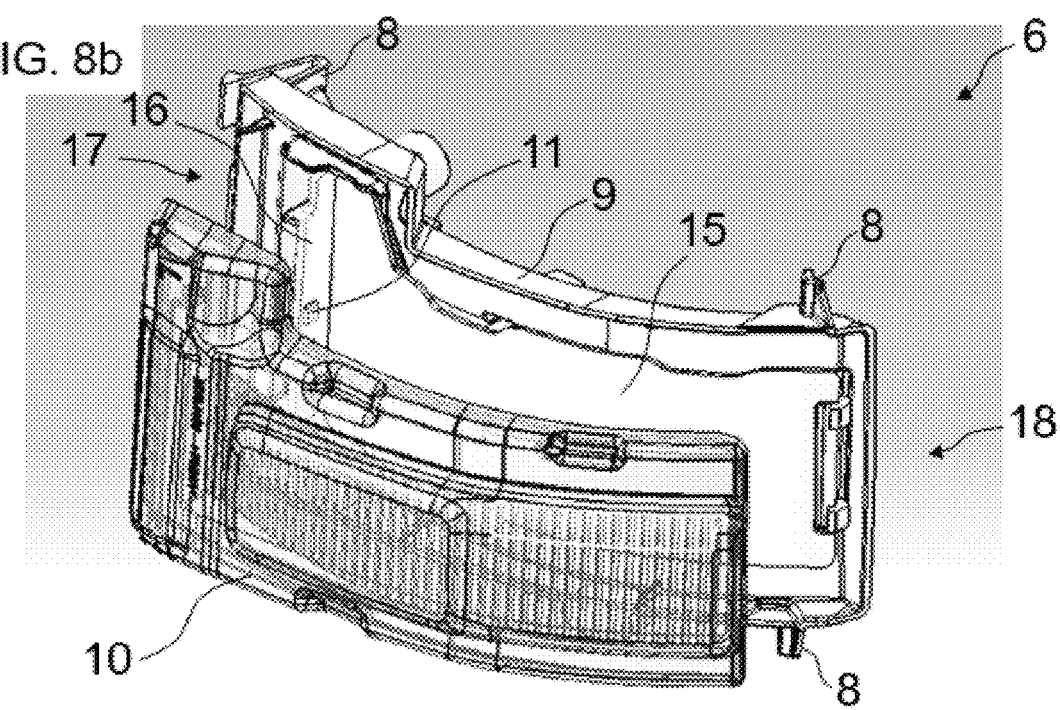
FIG. 8B illustrates a partly exploded view of the front side of the light module of the second configuration shown in FIG. 8A according to the present disclosure.

FIGS. 8A-B illustrate light module 6 of FIG. 6 in an exemplary second configuration. The second configuration of light module 6 is configured by the addition of a second functional device. Accordingly, as shown in FIG. 8A, the second functional device comprises two light sources 11 (in this example variation, the light sources 11 are implemented as LEDs) on the printed circuit board 16. Additionally, as shown in FIG. 8B, the second functional device further comprises a single reflector 15 for reflecting light emitted by the light source 11. Similar to the first functional device described above in FIGS. 7A-B, the second functional device is accommodated within the cavity formed by the base body 9 and the lens 10 when assembled together which can be seen in FIG. 8B.

In the exemplary variation shown in FIG. 8B, the light sources 11 are arranged at a first end 17 (herein also referred to as a proximal end) with respect to a widthwise direction of the light module 6 having a main light emitting direction being oriented towards a second end 18 (herein also referred to as a distal end) in the widthwise direction of the light module 6, wherein the second end 18 is located diametrically opposed to the first end 17.

The reflector surface of the reflector 15 (i.e. the surface of the reflector facing the lens 10) has an overall curvature which is convex with respect to a widthwise direction of the reflector 15 (corresponding to the width direction of the plane of projection of FIG. 8B). The convex curvature of the reflector 15 arranges the reflector surface such that it matches the curvature of the inner surface of lens 10. Furthermore, in the variation shown in FIG. 8B, the reflector surface of the reflector 15 is a closed reflector surface, i.e. the reflector surface does not have any opening/aperture in its reflecting area like the aperture 13 of the reflector 12 shown in FIG. 7B for example.

Further, in the variation of the light module 6 shown in FIG. 8B, the light sources 11 are attached to the printed circuit board (PCB) 16 which is located on and attached to the front side of the reflector 15. Moreover, in the variation shown, the PCB 16 does not provide a mounting portion for attaching the reflector 15 to the base body 9. The reflector 15 may be attached to the base body 9 of the light module 6 by clips, pawls and the like though not being limited thereto. This allows easy non-destructive removal of the reflector 15 and/or light source 11 from the light module 6. In another variation, the reflector 15 may include a light pipe to assist with directing the light from the light sources 11.

In the variations of the light module 6 described above, the PCB 14, 16, light sources 11 and the reflector 12, 15 are configurable and arrangeable such that, in the attached state of the light module 6 to the cover body 2, the light emitted by the light sources 11, at least partially, being reflected by the respective reflector 12, 15 and passing the lens 10 achieves different light functions, such as daytime running light, direction indicator, position light, surrounding lighting, spotlighting, or a combination thereof. Thus, the different configurations can be achieved via different pre-assembled functional devices.

Moreover, as shown in the elucidated variations, one light module 6 (i.e. only one) is adapted to receive one functional device selected from a plurality of different functional devices according to the respective light function to be implemented.

In the variation shown in FIGS. 8A-B with the second functional device, the specific configuration and arrangement of the light sources 11 and the reflector 15 facilitate a main light emitting direction of the light from the light source 11 to be directed essentially in the widthwise direction. The light originating from the first or proximal end 17 will pass the lens 10 mainly at the second or distal end 18. It is to be understood that some light emitted by the light source 11 will also pass the lens 10 at the lens portions between the first end 17 and the second end 18. Thus, this specific configuration of the light source 11 and the reflector 15, and thus, the second functional device is used to implement a direction indicator light function as traffic located at the side of a vehicle (not shown, but to which the exterior rearview mirror 1 is attached) or even behind the vehicle will recognize the blinking light within the exterior rearview mirror 1 comprising the light module 6 according to the variation shown in FIGS. 8A-B. Accordingly, the second light function can be that of a turn signal indicator.

Thus, the PCBs 14, 16 of the two light module configurations discussed with respect to FIGS. 7A-8B differ with respect to their arrangement, with PCB 14 being substantially parallel to the reflector 12 and PCB 16 being substantially perpendicular to the reflector 15.

The foregoing description of various preferred variation have been presented for purposes of illustration and description. It is not intended to be exhaustive or to limit the disclosure to the precise forms disclosed, and obviously many modifications and variations are possible in light of the above teaching. The example variation, as described above, were chosen and described in order to best explain the principles of the disclosure and its practical application to thereby enable others skilled in the art to best utilize the disclosure in various variation and with various modifications as are suited to the particular use contemplated. The features disclosed in the foregoing description, in the drawings and in the claims can be essential both individually and in any combination for the implementation of this disclosure in its various variation.

LIST OF REFERENCE NUMBERS

1 Exterior rearview mirror
2 Cover body
3 Mirror
4 Cover body opening
5 Mirror arm
6 Light module
7 Attachment point
8 Attachment means
9 Base body
10 Lens
11 Light source
12 Reflector
13 Aperture
14 Printed circuit board (PCB)
15 Reflector
16 Printed circuit board (PCB)
17 First (proximal) end
18 Second (distal) end

What is claimed is:

1. An exterior rearview device for an automotive vehicle, comprising:
    a cover body, wherein the cover body has a cover body opening and wherein the cover body covers a front part of at least one of a reflective means, a display or a camera accommodated in the cover body;
    a light module having a base body, a lens attachable to the base body and a functional device;
    wherein the functional device is one of a first functional device or a second functional device, and each of the first functional device and the second functional device includes a light source connected to a printed circuit board and a reflector having a reflector surface;
    wherein the base body is attachable to the cover body such that, in an attached state, the lens is arranged in the cover body opening;
    wherein the functional device is attachable to the base body such that, in the attached state, light from the light module passes through the lens to fulfil the specific light function of the functional device;
    wherein the reflector of the second functional device has a closed reflector surface; and
    wherein the light source of the second functional device is configured to be disposed between the closed reflector surface and the lens in the attached state.

2. The exterior rearview device according to claim 1, wherein each functional device fulfils a different light function, wherein the light module acts as a daytime running light, a direction indicator light, a position light, a surrounding light, or a spot light.

3. The exterior rearview device according to claim 1, wherein the reflector surface of the first functional device defines an aperture, wherein the light source is arranged in the aperture.

4. The exterior rearview device according to claim 3, wherein the reflector of the first functional device is arranged at least partially parallel to the printed circuit board and the aperture of the reflector is funnel-shaped, and
    wherein a main light emitting direction of the light of the first functional device is directed essentially in a forward direction as a forward-facing spot light.

5. The exterior rearview device according to claim 4, wherein the printed circuit board is arranged between the reflector and the base body in the attached state, and
    wherein the printed circuit board attaches the reflector to the base body comprised by the first functional device.

6. The exterior rearview device according to claim 1, wherein the light source of the second functional device is arranged at a first end with respect to a widthwise direction of the light module with a main light emitting direction being oriented towards a second end in the widthwise direction of the light module, the second end being located diametrically opposed to the first end to provide a direction indicator light; and
    wherein the reflector of the second functional device is arranged at least partly perpendicular to the printed circuit board.

7. The exterior rearview device according to claim 1, wherein the printed circuit board is arrange between the reflector and the lens in the attached state, wherein the printed circuit board mechanically attaches the reflector to the lens and is comprised by the second functional device.

8. The exterior rearview device according to claim 1, wherein the light source is attached on the printed circuit board, and wherein the light source is comprised by the second functional device.

9. The exterior rearview device according to claim 1, wherein the reflector surface of the reflector has an overall curvature being convex with respect to a widthwise direction of the reflector.

10. The exterior rearview device according to claim 1, wherein each functional device is detachably attachable, and the lens is detachably attachable.

11. The exterior rearview device according to claim 1, wherein each functional device is pre-formed.

12. A kit of parts comprising an exterior rearview device according to claim 1 with at least two different light devices.

13. An automotive vehicle comprising the exterior rearview device according to claim 1.

14. An exterior rearview device for an automotive vehicle, comprising:
    a cover body defining a cover body opening;
    a light module having a base body configured to attach to the cover body, a lens, and a functional device;
    wherein the functional device is one of a first functional device or a second functional device;
    wherein each of the first functional device and the second functional device achieves a specific light function and includes a light source connected to a printed circuit board and a reflector having a reflector surface;

wherein the lens is configured to be arranged in the cover body opening when the base body is attached to the cover body;

wherein the light source of the second functional device is configured to be disposed between a closed reflector surface of the second functional device and the lens when the base body is attached to the cover body.

* * * * *